United States Patent [19]

McLeod

[11] 4,298,024

[45] Nov. 3, 1981

[54] VALVE TIMER DEVICES

[76] Inventor: Jesse C. McLeod, 9930 Melissa Dr., Louisville, Ky. 40223

[21] Appl. No.: 84,088

[22] Filed: Oct. 12, 1979

[51] Int. Cl.³ .............................................. F16K 31/12

[52] U.S. Cl. ................................... 137/624.11; 91/38; 222/70

[58] Field of Search .......... 91/38; 137/624.11, 624.14; 222/70

[56] References Cited

U.S. PATENT DOCUMENTS

| | | | |
|---|---|---|---|
| 2,619,073 | 11/1952 | Brooks | 91/38 |
| 2,973,781 | 3/1961 | Cadella | 222/70 X |
| 3,605,554 | 9/1971 | Philbrick | 91/38 |

*Primary Examiner*—Robert G. Nilson

*Attorney, Agent, or Firm*—Edward M. Steutermann

[57] ABSTRACT

Pneumatic Actuator and timing means to provide a selectively timed control signal including a base means to receive a supply of pressurized fluid in chamber means to direct flow of fluid through the base means to signal output port to provide a selectively timed output signal.

4 Claims, 7 Drawing Figures

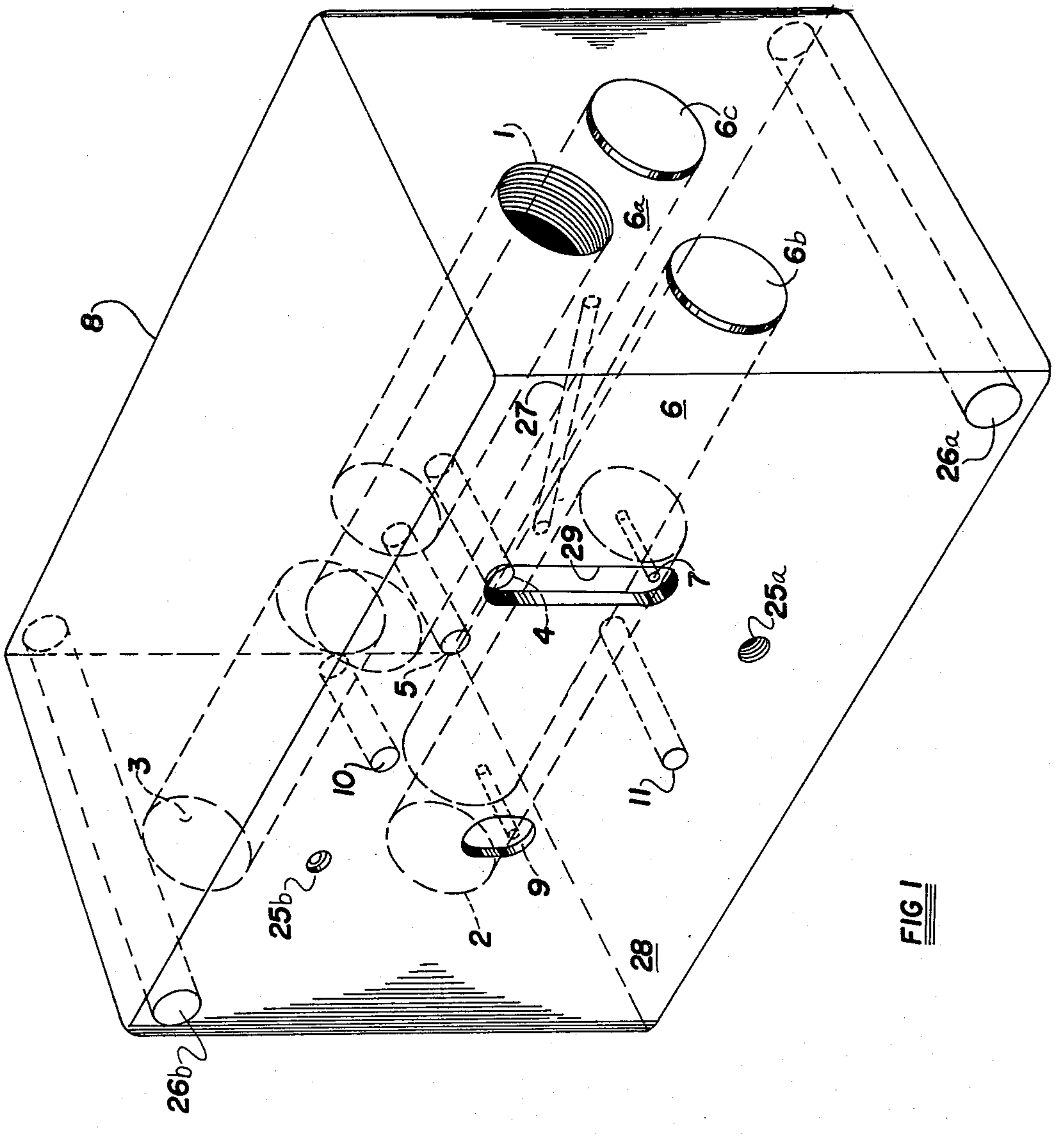
FIG I

VALVE TIMER DEVICES

BACKGROUND OF THE INVENTION

The present invention relates to a pneumatic actuator which requires no movable parts to activate a relay valve to provide a timed signal to activate other pneumatic devices.

Heretofore, certain timer devices have been provided in pmeumatic contril circuits which have included mechanically adjustable signal control mechanisms to provide a signal to be applied and maintained on a valve or port in a single stroke operation of an associated device. Devices within the scope of the present invention are particularly useful as pilot valves in the operation of pneumatic systems, for example, in the food industry to provide a selectively time fluid pulse to control the operation of an associated valve controlling flow of food or liquids to containers as the containers pass along a conveyor system where accuracy of timing and reliability are important.

Such prior timing arrangements have certain disadvantages in that the adjustable timer arrangement necessarily includes movable timing parts which have to be meticulously set and maintained to provide a constant single stroke function of a pre-selected timing interval.

In addition, such prior arrangements are expensive to fabricate because of the delicate nature of the movable timing parts to insure a constant time single stroke function.

SUMMARY OF THE INVENTION

The present invention is unique in that it provides a pneumatic actuator device to provide a selectively timed pneumatic signal of selected time interval using a simple relay valve where the device actuating the relay valve does not use movable parts. The invention, can for example, include a base consisting of three ports, a reservoir means including at least two chambers connected by a passageway, with cooperative selectively sized orifices which allow an input signal from a source of pressurized pneumatic fluid for example, compressed air or gas, to flow through the pneumatic actuator to the cooperative relay valve to provide an accurately time signal pulse to activate other pneumatic devices.

The present invention operates the relay valve without the use of actuating means requiring movable parts and provides a signal of selected time interval by metering the flow of the pneumatic fluid which is used as a signal supplied to the relay valve at a pre-selected rate of flow. A pressurized fluid is provided to the pneumatic actuator which activates the relay valve to provide a single timed output pulse and the device is reset by removing the pressurized fluid from the actuator then reapplying the pressurized fluid where the flow of the pressurized fluid can be controlled by an external control device, for example, a two-way valve operated by a foot pedal. For each pressurized fluid input signal the fluid pressure builds in a selected chamber of the relay valve to actuate the valve from one position to another. When a pre-selected pressure is attained in the chamber of the valve, the cooperative relay valve is activated when the signal moves the valve to compress a cooperative spring provided in the relay valve which allows the signal to flow into the signal output port within the pneumatic actuator device to activate other pneumatic devices. At the same time the signal is passing to the signal output port, part of the signal is bleeding into a reservoir means which communicates with the first chamber of the relay valve and ultimately resets the valve to terminate flow to the signal output port and other pneumatic devices when the pressure in the first chamber of the relay valve equalizes the pressure in the fourth chamber of the relay valve causing the spring to bias the valve in the cooperative relay valve to its first position to prepare for the next signal.

The output signal is provided for a selected time determined by the rate of flow of the signal through various sections of the base and then the output signal is terminated. The device is reset to provide the next output signal by bleeding the input fluid from the device.

Briefly, the present invention provides new and useful pneumatic arrangements for activating and resetting control means, for example, relay valves, without the use of movable parts. Because the invention accomplishes these objections without movable parts, maintenance expense is reduced and the device is not susceptible to malfunctions.

In addition, devices within the scope of the present invention are particularly useful in the operation of pneumatic systems, for example, the food industry to control the flow of food or liquid into a container. The present invention provides for the automatic resetting of the relay valve which insures, for example, that no excess food or liquid is dispensed into a container as the container passes along a conveyer system. Further even if the assembly line is stopped out of sequence and the external control device is left open providing a continuous fluid signal the present invention automatically cuts off the output signal which stops the flow of food or liquid into a container at the precise quanity desired, eliminating any waste of the product.

It will be understood that various other arrangements within the scope of the present invention will occur to those skilled in the art upon reading the disclosure set forth hereinafter.

BRIEF DESCRIPTION OF THE DRAWING

FIG. 1 shows a perspective view of an example of a pneumatic actuator in accordance with the present invention described hereinafter;

Figure 2A:
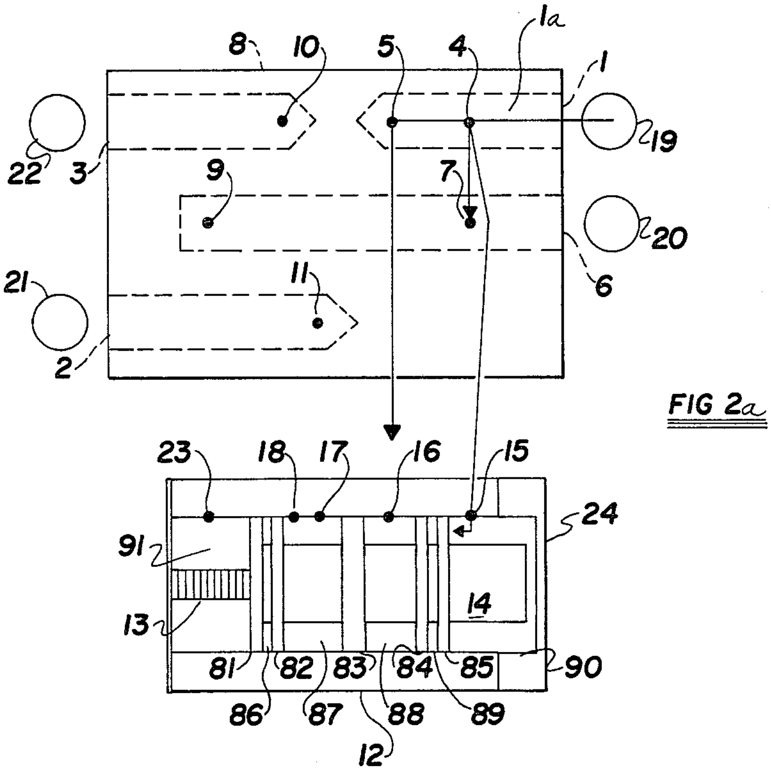

FIGS. *2a–2d* present a schematic illustration of the flow of a fluid signal such as gas or air as it flows through the apparatus as shown in FIG. 1;

FIG. *3a* presents a schematic illustration of external control device and the flow of a fluid signal such as gas or air as it flows through the apparatus as shown in FIG. *2b;*

FIG. *3b* presents a schematic illustration of external control device and the flow of a fluid signal such as gas or air as it exhausts through the apparatus as shown in FIG. *2d;*

With respect to the illustration shown in FIG. 1 the example of the actuator shown is a rectangular block 8 which has three ports, 1,2, and 3, where for example, ports 1, 2 and 3 can be threaded for interconnection with cooperative devices as described hereinafter. Block 8 also provides a reservior means consisting of at least two chambers 6 and 6*a* connected by passageway 27, and where various fluid flow orifices 4, 5, 7, 9, 10 and 11 described hereinafter interconnect with a cooperative relay valve shown schematically and described hereinafter.

The reservoir means shown includes two cylindrical chambers 6 and 6*a* connected by a passageway 27. It has been found that a reservior means consisting of at least two chambers and a connecting passageway provides the most optimum conditions for operation of the one-shot valve when used with a pressurized fluid. In the example shown, the ends of chambers 6 and 6*a* are plugged by means of the plugs 6*b* and 6*c* so that chambers 6 and 6*a* are capable of holding a selected quantity of pressurized fluid.

The pneumatic actuator 8 is provided with various orifices 4,5,7,9,10 and 11 described hereinafter which are designed to function at pre-selected fluid pressure to provide selected fluid flow rates at such pressures. The size of the various orifices allow the inlet signal fluid to flow through the pneumatic actuator 8 at specific pre-selected rates to provide a selectively timed output control signal to actuate selected pneumatic devices by operation of the relay valve 12 shown schematically in FIGS. 2*a*–2*d* and described hereinafter. The relay valve is adapted to be mounted on a face 28 of the pneumatic actuator 8. Threaded taps 25*a* and 25*b* can be provided to mount the relay valve 12 as shown schamtically in FIGS. 2*a*–2*d* to the pneumatic actuator 8.

As also shown in FIG. 1, orifices 26*a* and 26*b* can be provided for the selective attachment of the pneumatic actuator 8 to other devices.

In the illustration shown a port 1 is provided in block 8 for admission of a selected pressurized fluid. Port 1 is provided with two cooperative interconnecting orifices 4, connecting with a groove 29 in the face of block 8, and 5. Orifices 4 and 5 allow the pressurized fluid to exit and enter port 1. Orifice 4 additionally allows the fluid to bleed into orifice 7 by means of recessed groove 29 where orifice 7 communicates with reservoir chamber 6 to permit fluid flow into reservoir chamber 6. Similarly orifice 9 is provided for emission of the fluid from reservoir chamber 6 at a selected rate of flow dependent on the fluid pressure in reservoir chamber 6 and the size of orifice 9.

Signal output port 2 is provided to receive the output signal, for example a compressed fluid of selected pressure, which activates other pneumatic devices. Signal output port 2 is, advantageously provided with an orifice 11 to meter the compressed fluid received at signal output port 2, and additionally meters the fluid signal which bleeds out of signal output port 2 to ready signal output port 2 for another signal.

A bleed port 3 is provided for escape of fluid from the pneumatic actuator means 8 to ready the system to receive another signal. Bleed port 3 is provided with an orifice 10 which allows the fluid bleeding from signal output port 2 through relay valve 12 to flow into bleed port 3.

As previously discussed, pneumatic actuator 8 is designed to be used in conjunction with a cooperative relay valve 12 as shown schematically in FIGS. 2*a*–2*d*.

FIGS. 2*a*, 2*b*, 2*c* and 2*d* are sequential schematic illustrations of operation of the pneumatic actuator 8 with the cooperative relay valve 12. Relay valve 12 is shown schematically and includes a slide valve assembly 14 having a multiplicity of cooperative vanes 81–85 where a chamber 86 is defined between vanes 81–82; a chamber 87 is defined between vanes 82–83; chamber 88 is defined between vanes 83 and 84 and a chamber 89 is defined between vanes 84–85. A chamber 90 is formed between vane 85 and the plastic cover 24. In the illustration shown in FIG. 2*a* a spring 13 is provided to bias valve assembly to the rest position shown.

More particularly, FIG. 2*a* shows the mode where a fluid signal is provided from a source 19, for example, a constant pressure air supply to inlet port 1 of the pneumatic actuator 8. The fluid flows through port 1 into a cavity 1*a* in pneumatic actuator 8 thence to orifices 4 and 5. The fluid flows through orifice 4 at a rate dependent on inlet fluid pressure and the size of orifice 4 to relay valve 12 through valve orifice 15. As previously described, FIG. 2*a* shows valve 14 and spring 13 in rest position. A plastic cover 24 is attached to the cooperative relay valve 12 to make the cooperative relay air tight.

Valve 14 in the position shown in FIG. 2*a* allows gas to enter the relay valve 12 through valve orifices 15 and 16. When sufficient gas pressure is achieved in chamber 90 the force of the pressure moves the valve 14 to the position shown in FIG. 2*b* and compresses the spring 13 allowing the fluid accumulated in chamber 88 to exit through valve orifice 17 and orifice 11 to signal output port 2. The gas continues to flow through signal output port 2 to activate other pneumatic devices 21.

While fluid is passing through port 1 and orifice 4 into the relay valve 12, the design of the pneumatic actuator 8 allows fluid to bleed at a prescribed rate from orifice 4 through a recessed groove 29 into orifice 7 and the reservoir 6 and 6*a*. As the fluid pressure in the reservoir system 6 and 6*a* builds up, it passes through the reservoir system and into orifice 9.

Figure 2B:
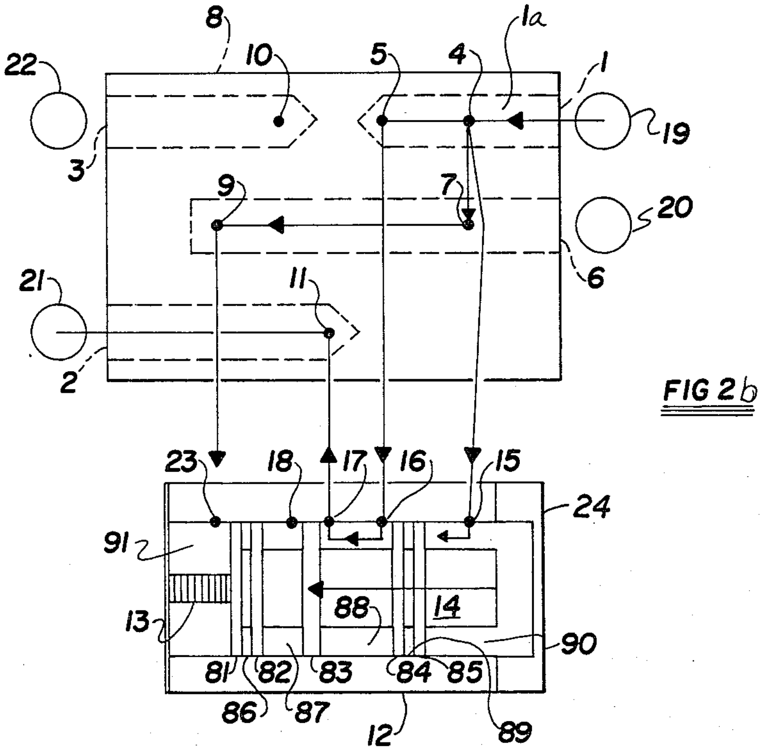

As shown in FIG. 2*b*, the fluid then passes into the cooperative relay valve 12 through valve orifice 23 where the pressure on that end of the valve starts to increase.

Figure 2C:
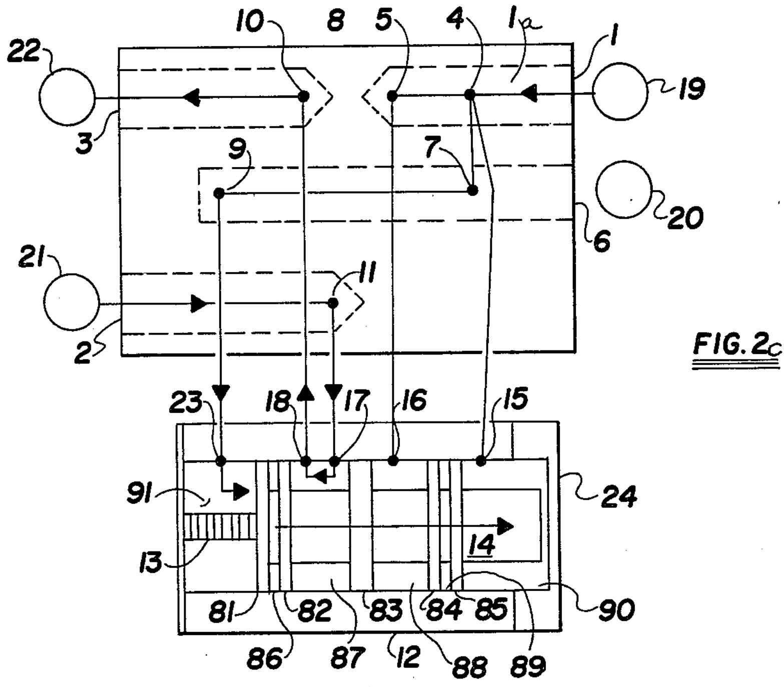

When the pressure on both sides of the valve is equalized, as shown in FIG. 2*c*, the spring 13 returns to its normal position and moves the valve 14 back to its rest position as shown in FIG. 2*c* where valve 14 allows the fluid access to valve orifices 17 and 18, and chamber 87, while blocking the flow of fluid to valve orifice 16.

Also when valve 14 returns to its rest position the fluid in signal output port 2 of the pneumatic actuator 8 bleeds out of the system as shown schematically in FIG. 2*c* through orifice 11 and valve orifice 17 into chamber 87 of relay valve 12. The fluid continues to bleed through valve orifice 18 and enters bleed port 3 of pneumatic actuator 8 through orifice 10 and exits the pneumatic actuator 8 through a muffler system 22 attached to the end of bleed port 3.

Figure 2D:
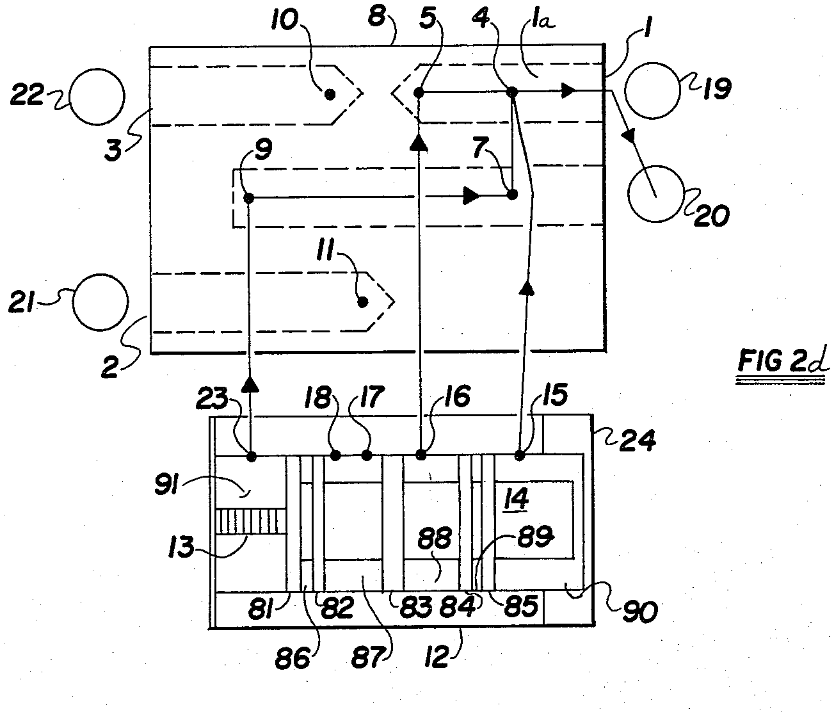

To complete the cycle the fluid pressure at the other end of the pneumatic actuator is bled out of the system, as shown schematically in FIG. 2*d*. The fluid in the port 1 and reservoir system 6 and 6*a* are bled out of the pneumatic actuator by use of an external control device (not shown) which can be either electronically, mechanically, or manually operated. The fluid from chamber 91 and reservoir system 6 and 6*a* bleeds out of orifice 7 into port 1 through orifice 4. Simultaneously, the fluid is bled out of chambers 90 and 88 of the relay valve through valve orifices 15 and 16 respectively and enters port 1 through orifice 4 and 5 respectively. The fluid in port 1 exits the pneumatic actuator through a muffler system 20.

Figure 3A:
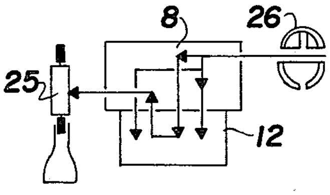

As shown in FIG. 3*a* the external control device 26, for example, a two-way valve, can be operated by a foot pedal (not shown). When the foot pedal is engaged it allows the fluid signal to flow through the two-way valve 26 into pneumatic actuator 8 and the relay valve 12 to actuate other pneumatic devices, for example, a liquid dispensing device 25, but only for a selected time until valve 12 has reset as described heretofore to provide a signal of selected time interval.

Figure 3B:
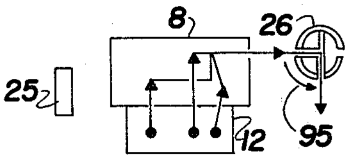

When the foot pedal is released, the two-way valve 26 rotates as shown by the arrow 95 in FIG. 3*b* and provides for the fluid signal to be exhausted from the pneumatic actuator 8 and the relay valve 12 as shown in FIG. 3*b*. The path of signal flow through the pneumatic actuator 8 and relay valve 12 is shown in FIG. 2*d* and described heretofore.

When this entire cycle is completed, the pneumatic actuator 8 is ready for another signal and will repeat the cycle as described above and shown schematically in FIGS. 2*a*, 2*b*, and 2*c* and 2*d*. The signals entering the pneumatic actuator are regulated to enable the preceding signal to complete its cycle before the next signal is given.

The invention claimed is:

1. A pneumatic actuator and timing means to provide a selectively timed output control signal including base means having a first port communicating with a supply of pressurized fluid, first orifice means communicating with said first port, second orifice means communicating with said first port means, third orifice means communicating with said first orifice means, reservoir means consisting of at least two chambers connected by a passageway communicating with said third orifice means, fourth orifice means communicating with said reservoir means, signal output port means, fifth orifice means communicating with said signal output port means, bleed port means, sixth orifice means communicating with said bleed port means; further including valve means where said valve means includes a valve body defining a valve chamber adapted to receive a valve member longitudinally movable therein with bias means to urge said valve member from a second position within said valve chamber to a first position within said valve chamber and where said valve member includes first vane means defining a first chamber between said first vane means and one end of said valve body, second vane means in spaced relation from said first vane means defining second chamber within said valve body between said first and second vane means, third vane means located in spaced relation from second vane means to define a third chamber within said valve body between said second and third vane means, and a fourth chamber within the valve body between said third vane means and a second end wall of said valve body where said valve body further includes first valve orifice means communicating with said first orifice means and said fourth chamber, second valve orifice means communicating with said second orifice means and said third chamber, third valve orifice means communicating with said fifth orifice means and said second chamber when said valve member is in said first position and with said third chamber when said valve member is in second position, fourth valve orifice means communicating with said sixth orifice means and said second chamber, fifth valve orifice means communicating with said fourth orifice means and said first chamber whereby said valve member is moved from said first position to said second position by selected pressure in said fourth chamber and where said fluid flows from said first port to said fourth chamber to move said valve member to said second position where said fluid flows to said signal output port and said first chamber until a selected pressure is achieved in said first chamber where said valve member returns to said first position to terminate said fluid flow to said signal output port.

2. The invention of claim 1 wherein said orifice means are provided to allow said pressurized fluid to flow through said pneumatic actuator and timing means and said valve means at a prescribed rate wherein the size of said reservoir means determines the rate at which said pressurized fluid flows through said pneumatic actuator and timing means and determines the duration of said selectively timed output signal which is measured by the time interval between the moment said valve member moves to said second position and the moment said valve member returns to said first position.

3. The invention of claim 1 wherein said bleed port bleeds the pressurized fluid from said signal output port and said second chamber when said valve member returns to said first position.

4. The invention of claim 1 wherein said pneumatic actuator and timing means includes an external control device wherein said external control device provides for admission of said pressurized fluid to said pneumatic actuator and timing means and said valve means, and further provides a selected time interval after said valve member returns to said first position for bleeding of said pressurized fluid from said first chamber, said reservoir means, said fourth chamber, and said first port to ready said pneumatic actuator and timing means and said valve means for another pressurized signal.

* * * * *